US012603555B2

(12) United States Patent　　　　(10) Patent No.:　US 12,603,555 B2

Padovan　　　　　　　　　　　　　(45) Date of Patent:　　Apr. 14, 2026

(54) DRIVE UNIT WITH STATOR, ROTOR, AND PLANETARY GEAR SET

(71) Applicant: RIMAC TECHNOLOGY LLC, Sveta Nedelja (HR)

(72) Inventor: Dominik Padovan, Nova Gorica (SI)

(73) Assignee: RIMAC TECHNOLOGY LLC, Sveta Nedelja (HR)

(*) Notice: Subject to any disclaimer, the term of this patent is extended or adjusted under 35 U.S.C. 154(b) by 12 days.

(21) Appl. No.: 18/525,794

(22) Filed: Nov. 30, 2023

(65) Prior Publication Data

US 2024/0204635 A1　　Jun. 20, 2024

(30) Foreign Application Priority Data

Dec. 16, 2022　　(EP) ..................................... 22214067

(51) Int. Cl.
　*H02K 16/02*　　　(2006.01)
　*H02K 5/173*　　　(2006.01)
　*H02K 7/00*　　　(2006.01)
　*H02K 7/116*　　　(2006.01)

(52) U.S. Cl.
　CPC ............. *H02K 16/02* (2013.01); *H02K 5/173* (2013.01); *H02K 7/003* (2013.01); *H02K 7/116* (2013.01)

(58) Field of Classification Search
　CPC .... H02K 5/173; H02K 5/1732; H02K 5/1735; H02K 7/003; H02K 7/116; H02K 7/083; H02K 7/085
　See application file for complete search history.

(56) References Cited

U.S. PATENT DOCUMENTS 9,333,843 B2 * 5/2016 Suzuki .................... B60B 35/18
10,239,401 B2 * 3/2019 Branning ............... H02K 7/116

* cited by examiner

*Primary Examiner* — Huan Le

(74) *Attorney, Agent, or Firm* — Hodgson Russ LLP

(57) ABSTRACT

Disclosed is a drive unit. The drive unit comprises a housing, a stator, a rotor, a planetary gear set, and an interface system. The rotor comprises a rotor shaft rotatable around a rotation axis and a sun gear coupled to said rotor shaft. The planetary gear set comprises a ring gear fixed to said housing, a plurality of planet gears in meshing engagement between the sun gear and the ring gear, and a planet carrier supporting them. Furthermore, the planet carrier comprises an axial protrusion developing along the rotation axis and defining a gear shaft concentric to the rotor shaft. The interface system interfaces the rotor with the planetary gear set and comprise at least one support bearing interposed between the rotor shaft and the gear shaft.

13 Claims, 11 Drawing Sheets

DRIVE UNIT WITH STATOR, ROTOR, AND PLANETARY GEAR SET

CROSS-REFERENCE TO RELATED APPLICATION

This application claims priority to European Patent Application No. 22214067.5, filed Dec. 16, 2022, the entire disclosure of which is incorporated herein by reference.

FIELD OF THE INVENTION

The present invention pertains to the technical field of motor components. In particular, the present invention relates to a drive unit that could be advantageously implemented as a drive unit for a vehicle.

BACKGROUND OF THE INVENTION

It is known in the art that electric motors are usually built in two main sub-assemblies contained inside a dedicated housing, namely the stator (which is "fixed", e.g. with respect to an engine bay of a vehicle) and the rotor, which in turn rotates into the just cited stator: rotors usually bear a circumferential or coronal assembly of magnetically active elements, whose interaction with the dynamic magnetic fields generated in cooperation with the stator determine the generation of torque (which is available at the central rotation shaft of the rotor itself).

The rotor can then be coupled/connected with a gear set, usually contained inside a dedicated housing, through which the generated torque is transferred to further components of the vehicle.

In order to increase the efficiency of such drive unit, formed by the combination of stator/rotor and the gearset, it is necessary to eliminate as much loss-generating elements as possible from the power flow.

To achieve this goal, it is known to implement bearings that couple the moving portions of the assembly with the static ones to reduce to a minimum the mechanical losses between the various components involved and the consequent power loss.

In particular, the rotor and the gear set are customarily interfaced with the respective housing through specific bearings that further to allowing the movement of said components also support their weight and provide for structural stability.

However, the structure of known drive unit is cumbersome and complicated, requiring to implement a considerable number of components to guarantee the stability of both the gearset and the motor to which the first is connected.

Furthermore, it is necessary to take great care in designing the housing dedicated to the different components insofar the walls that result to be placed between the gear set and the rotor/stator need to be at the same time thin enough to avoid wasting space and thick enough to be resistant and solid.

It is not always possible to find an optimal solution between the above two opposite needs, thus resulting in less than satisfactory structure and connection between the various components that form the drive unit.

In view of the above it is evident how in the field there is a great need for novel solution providing new configuration aimed at improving the overall structure of drive units to make them more durable efficient and at the same time reducing their volume, weight and complexity also allowing to implement an easier/simplified assembly process.

SUMMARY OF THE INVENTION

In this context, the technical purpose which forms the basis of this invention is to provide a drive unit which overcomes at least some of the above-mentioned drawbacks of the prior art.

In particular, the aim of the invention is to provide a drive unit with an increased efficiency deriving from a reduction in the power-flow loss which is obtained through a corresponding reduction in bearing churning and load losses.

A further aim of the invention is to provide a drive unit with a simplified structure while still guaranteeing an optimal efficiency level and a reduced encumbrance and weight.

The technical purpose indicated and the aims specified are substantially achieved by a drive unit comprising the technical features described in one or more of the appended claims.

The invention describes a drive unit, specifically a drive unit for a vehicle.

Said drive unit essentially comprises a housing, a stator, a rotor, a planetary gear set and an interface system.

The housing defines an internal volume inside of which are placed/housed all the other components of the drive unit.

Inside the housing are thus placed the stator and the rotor and the latter comprises a rotor shaft rotatable around a rotation axis and a sun gear coupled to the rotor shaft.

The planetary gear set, also placed inside the housing, comprises a ring gear a plurality of planet gears and a planet carrier.

The ring gear is fixed to the housing, the planet gears are in meshing engagement between the sun gear and the ring gear, and the planet carrier supports the plurality of planet gears.

The planet carrier comprises an axial protrusion developing along the rotation axis and defining a gear shaft concentric to the rotor shaft.

The interface system is configured to interface the rotor with the planetary gear set and comprise at least one support bearing interposed between the rotor shaft and the gear shaft.

Advantageously, the drive unit provides for a compact structure with just one housing configured to lodge all the other components and the interface system allow to have the rotor supported via its rotor shaft by the gear shaft of the planetary gear set.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

Figure 1:
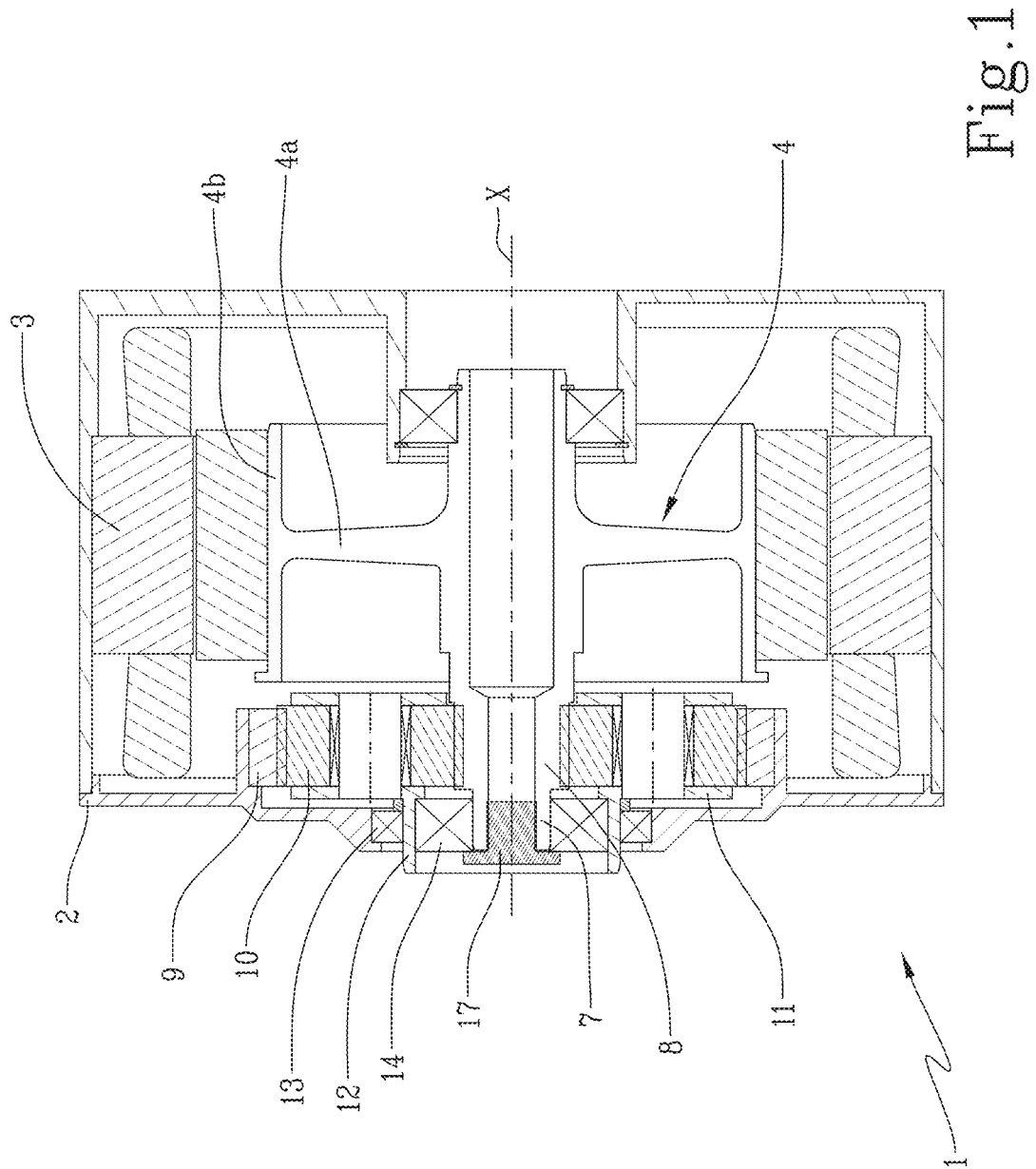
FIG. 1 shows the general structure of a drive system according to the present invention.

The drawings referred to in this description are not to be understood as being drawn to scale except if specifically noted, and such drawings are only exemplary in nature.

DETAILED DESCRIPTION OF THE INVENTION

While the invention is susceptible to various modifications and alternative forms, an embodiment thereof has been shown by way of example in the drawings and will be described here below. It should be understood, however that it is not intended to limit the invention to the particular forms disclosed, but on the contrary, the invention is to cover all modifications, equivalents, and alternative falling within the spirit and the scope of the invention.

The term "comprises", comprising, or any other variations thereof, are intended to cover a non-exclusive inclusion, such that a setup, structure or method that comprises a list of components or steps does not include only those components or steps but may include other components or steps not expressly listed or inherent to such setup or structure or method. In other words, one or more elements in a system or apparatus proceeded by "comprises . . . a" does not, without more constraints, preclude the existence of other elements or additional elements in the system or apparatus.

For better understanding of this invention, reference would now be made to the embodiment illustrated in the accompanying Figures and description here below, further, in the following Figures, the same reference numerals are used to identify the same components in various views.

References throughout the preceding specification to "one embodiment", "an embodiment", "one example" or "an example", "one aspect" or "an aspect" means that a particular feature, structure, or characteristic described in connection with the embodiment or example is included in at least one embodiment of the present disclosure. Thus, appearances of the phrases "in one embodiment", "in an embodiment", "one example" or "an example", "one aspect" or "an aspect" in various places throughout this specification are not necessarily all referring to the same embodiment or example.

Furthermore, the particular features, structures, or characteristics can be combined in any suitable combinations and/or sub-combinations in one or more embodiments or examples.

In the accompanying figures with the reference numeral 1 is indicated in general a drive unit, which could be advantageously implemented as the drive unit for a vehicle.

Structurally, as can be seen for example in FIG. 1, the drive unit 1 comprises a housing 2, a stator 3, a rotor 4, a planetary gear set 5 and an interface system which are placed in between the rotor 4 and the gear set 5 to couple them.

The housing 2 defines a cavity, specifically a single cavity, apt to contain all the other components of the drive unit 1 and in particular both the rotor 4 and the planetary gear set 5.

Thus, the stator 3 is lodged inside the housing 2 and, as can be seen in the attached figures, it also defines in turn a cavity inside of which are inserted the rotor 4, the gear set 5 and the interface system.

Consequently, the rotor 4 is placed both inside the housing 2 and the stator 3, to which it is rotatably coupled.

For example, the stator 3 comprises a plurality of windings through which a current can flow and the rotor 4 comprises a plurality of permanent magnets so that when a current flows in the stator 3 the generated field causes the rotor 4 to start rotating.

More in detail, the rotor 4 comprises a rotor shaft 7 which is rotatable around a rotation axis X and is preferably completely lodged inside the housing 2.

Furthermore, the rotor 4 also comprises a sun gear 8, which is coupled to the rotor shaft 7.

According to a possible embodiment, the sun gear 8 may be a different component from the rotor shaft 7 and coupled/linked to the same in such a way as to make them rotate jointly.

Otherwise, according to a further possible embodiment of the present invention, the rotor shaft 7 presents a toothed portion configured to define the sun gear 8 so that the rotor shaft 7 and the sun gear 8 are made of a single piece.

In general, the sun gear 8 concurs to define the interface between the rotor 4 and the gear set 5, which is also placed inside the housing 2 side by side to the rotor 4.

Figure 2A:
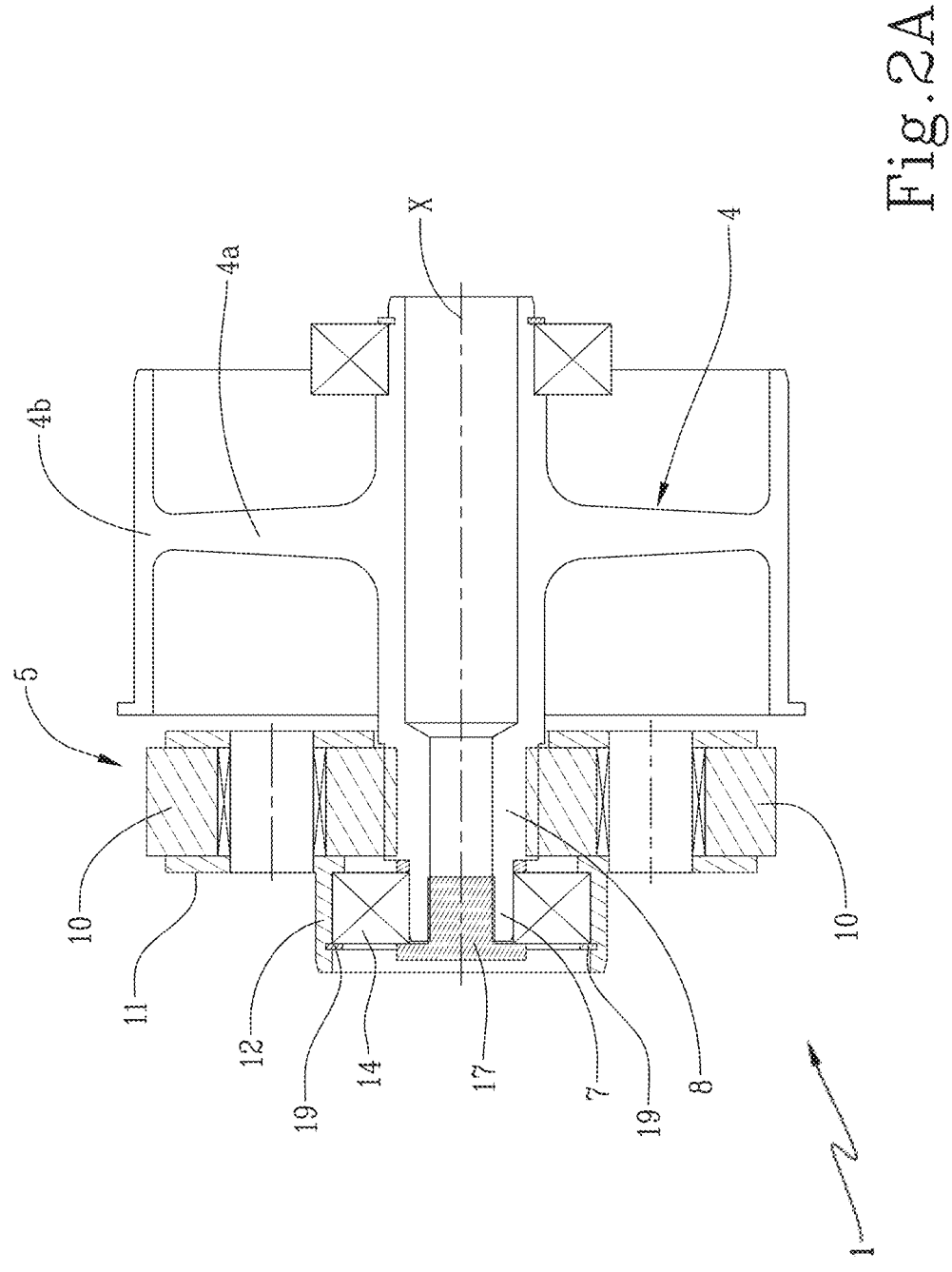
FIGS. 2A and 2B show a detail respectively of a single stage and a multi-stage planetary gear set coupled to the rotor according to a first embodiment of the drive system.
Figure 2B:
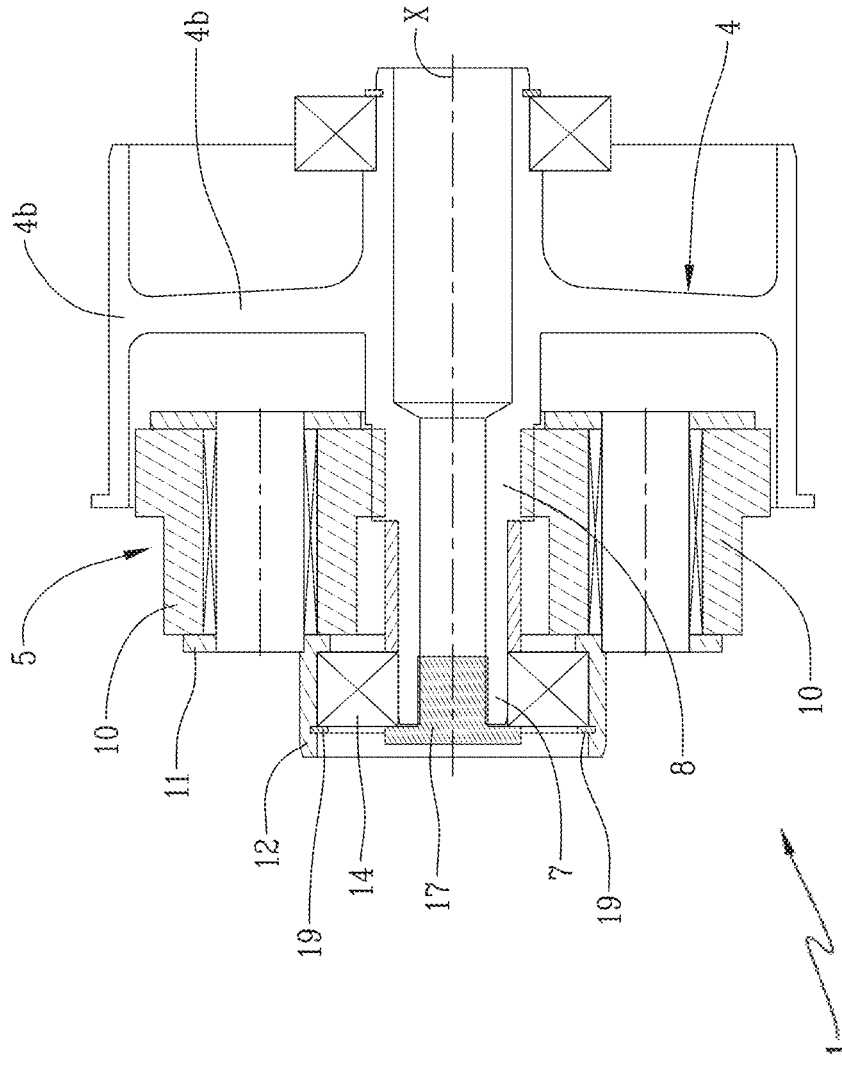
Figure 3A:
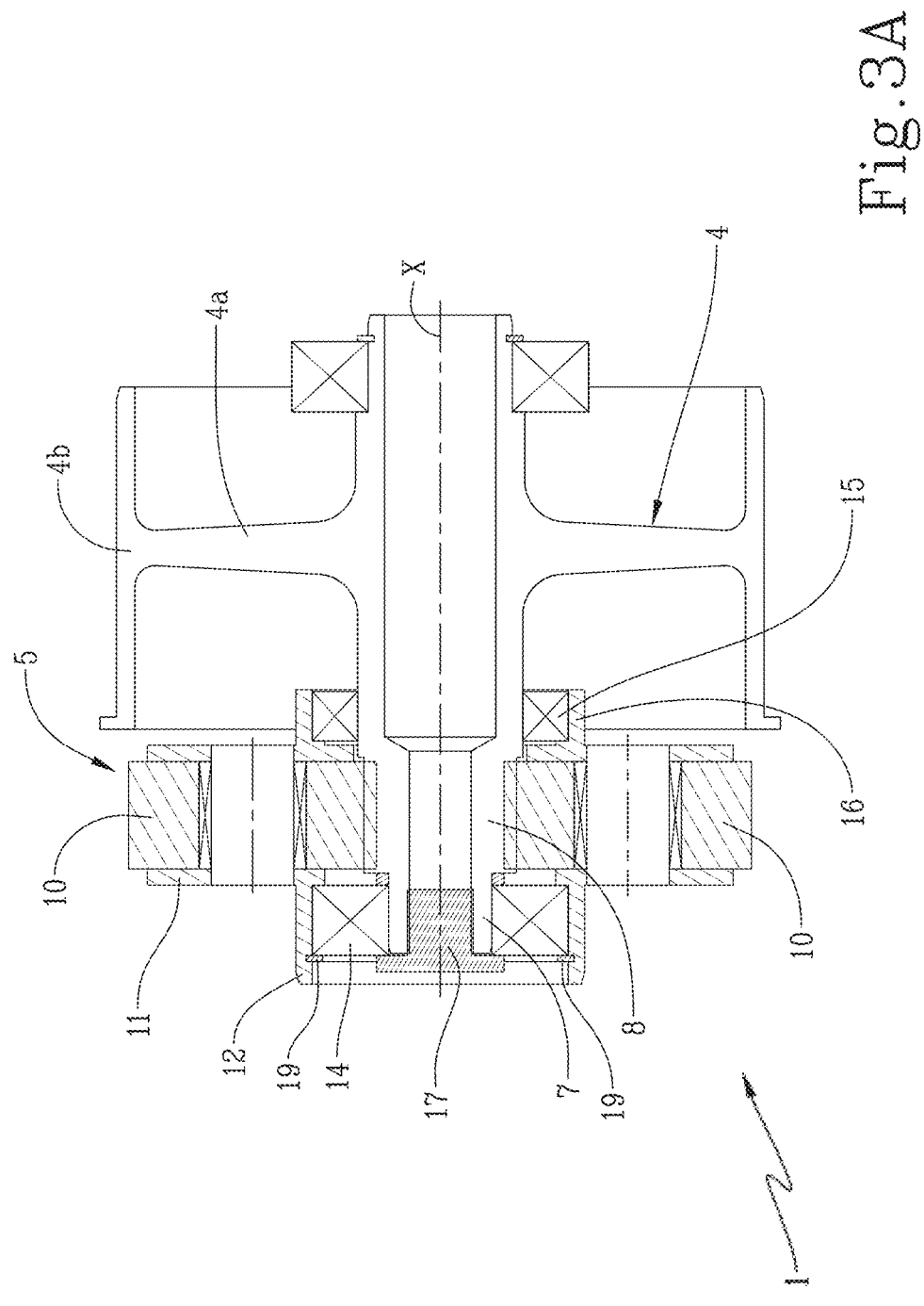
FIGS. 3A and 3B show a detail respectively of respectively a single stage and a multi-stage planetary gear set coupled to the rotor according to a second embodiment of the drive system.
Figure 3B:
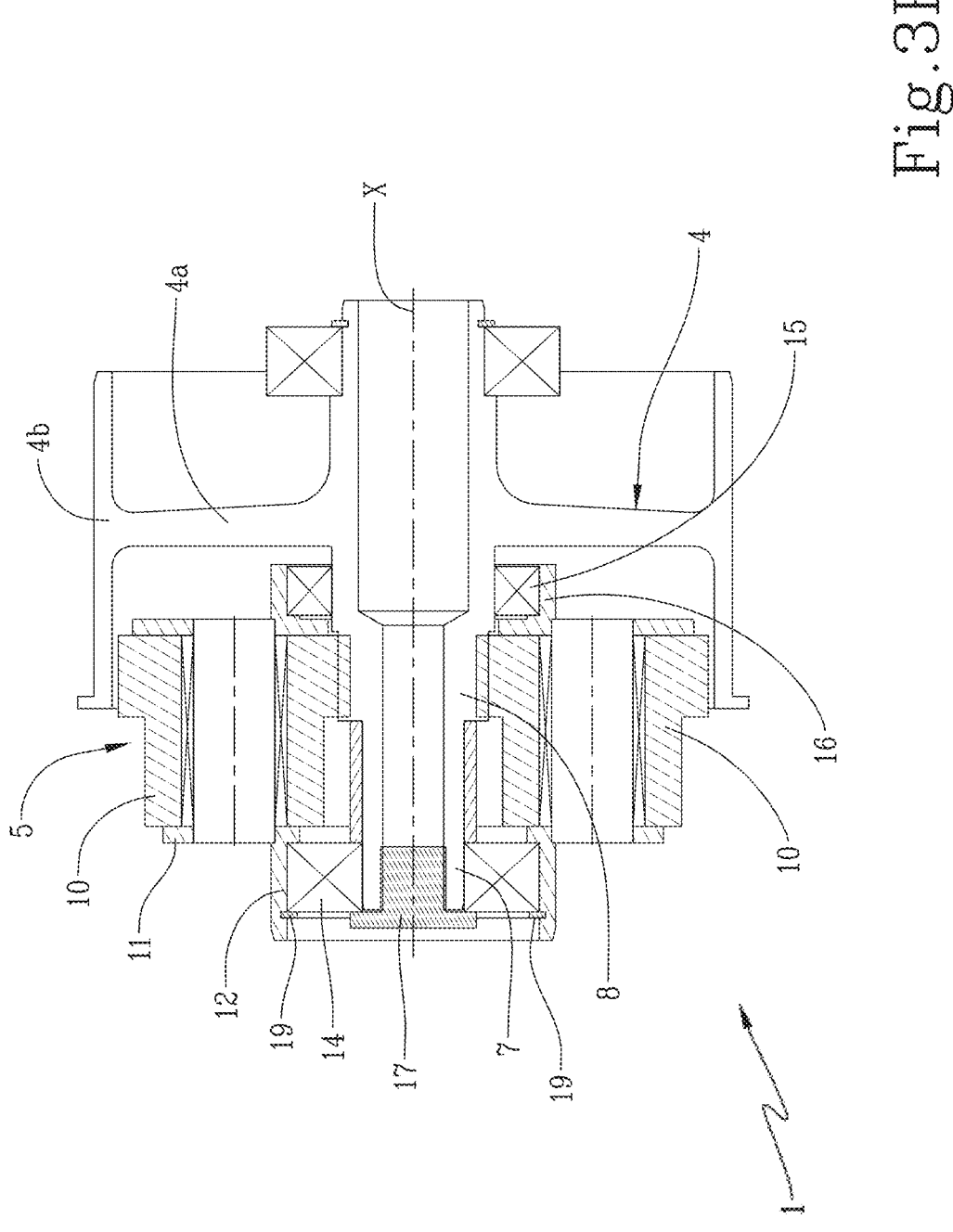
Figure 4A:
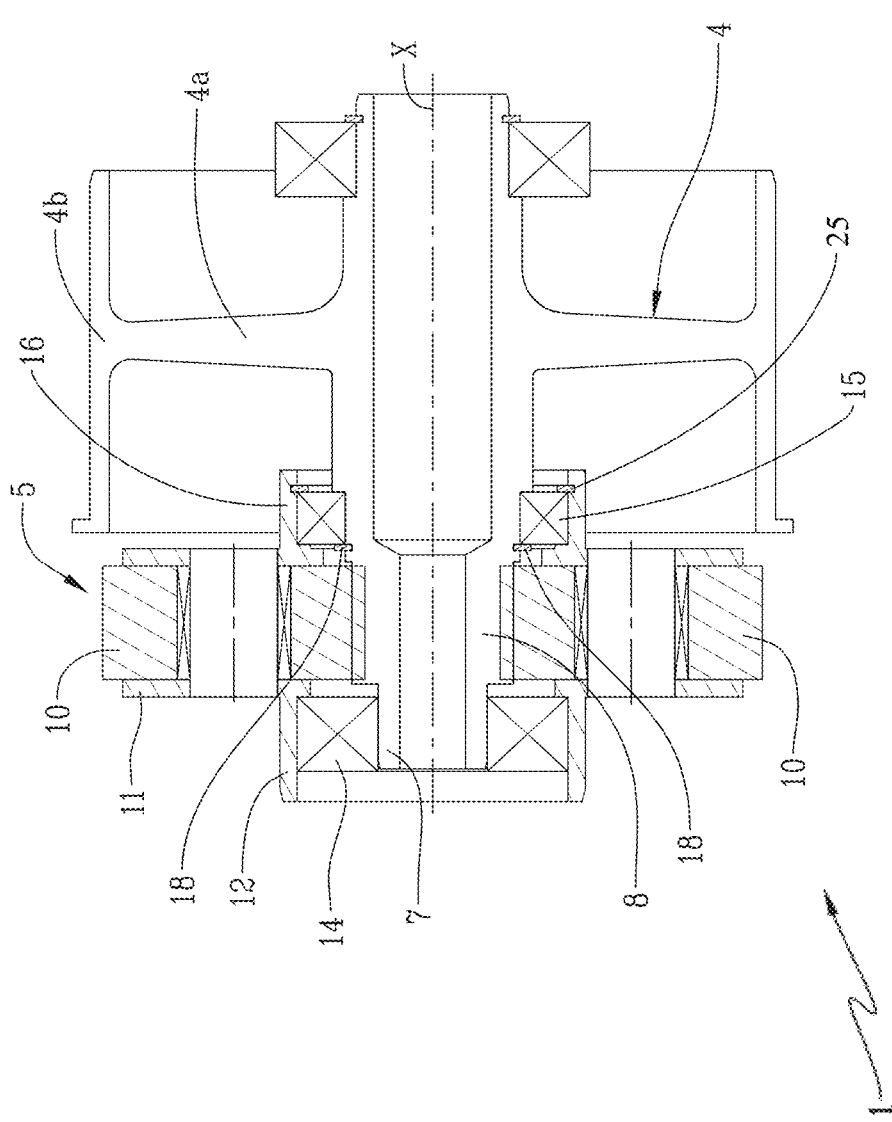
FIGS. 4A and 4B show a detail respectively of respectively a single stage and a multi-stage planetary gear set coupled to the rotor according to a third embodiment of the drive system.
Figure 4B:
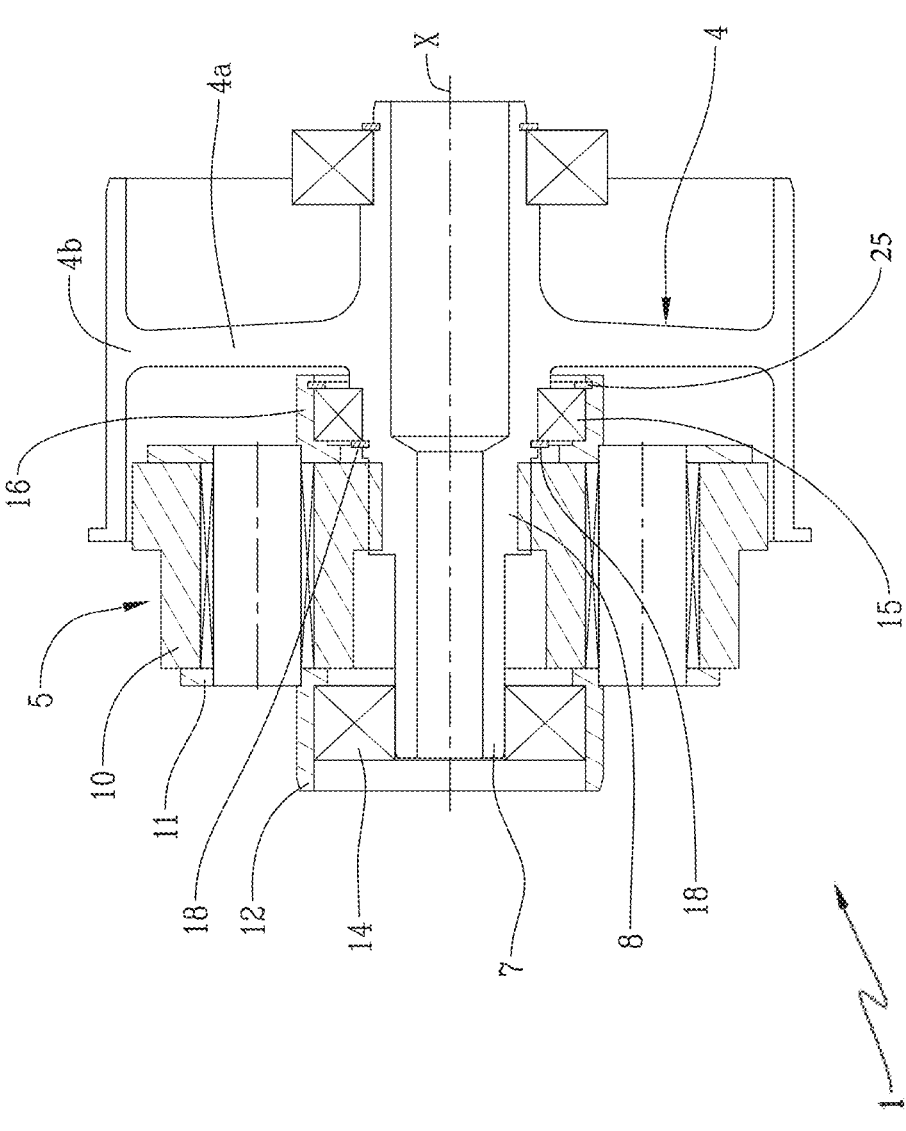

Preferably, the gear set 5 is a compound planetary gear set which comprises at least two stages, as illustrated in FIGS. 2B, 3B and 4B, all of which are in any case placed inside the housing 2 side by side to the rotor 4.

Irrespective of the specific number of stages, the gear set 5 comprises a ring gear 9 fixed to the housing 2 and a plurality of planet gears 10 in meshing engagement between the sun gear 8 and the ring gear 9.

It is to say that the planet gears 10 are placed between the sun gear 8 and the ring gear 9, so that when the rotor shaft 7 rotates it also causes the planet gears 10 to rotate around their own rotation axis and, due to their engagement to the ring gear 9, to start a revolution movement around the rotation axis X of the rotor shaft 7.

The planet gears 10 are further supported by a planet carrier 11, which comprises an axial protrusion developing along the rotation axis X and protruding outside the housing 2 away from the same so as to define a gear shaft 12 concentric to the rotor shaft 7.

Consequently, in a use configuration, the rotation of the rotor shaft 7 is transferred to the gear shaft 12 through the planet gears 10 which in their revolution motion cause the whole planet carrier 11 to rotate.

On the other hand, should the gear shaft 12 be made to rotate, it will cause a rotation of the whole planet carrier 11 thus starting the revolution motion of the planet gears 10 which would in turn cause the rotor shaft 7 to rotate.

The gear shaft 12 may be then coupled to other components of a power train of the vehicle or any element which may be motorized by the drive unit 1 and/or from which the drive unit 1 may receive a torque.

Between the gear shaft 12 and the housing 2, i.e., at the seat that allows the protrusion of the planet carrier 11 to exit from the housing 2, the drive unit 1 comprises an interfacing bearing 13 which serves the double purpose of smoothing the rotation of the gear shaft 12 and providing a useful structural support for the same and consequently, as will be more apparent from the following, also to the rotor 4.

More in detail, the rotor 4 and the gear set 5 are coupled/interfaced through the interface system, which comprises at least a support bearing 14 interposed between the rotor shaft 7 and the gear shaft 5.

Said interfacing bearing 13 is preferably concentric and axially overlapping the support bearing 14 when present, so that the rotor shaft 7 can be supported on the housing 2 in turn by the support bearing 14, the gear shaft 12 and the interfacing bearing 13.

In general, the rotor shaft 7 is supported by the gear set 5 which if radially positioned between the former and the housing 2, and consequently, the rotor 4 is not directly interfaced with the housing 2 on the output side (i.e., the side on which the gear shaft 12 exits from the housing 2) of the drive unit 1.

According to the above presented structure, the rotor 4 and the gear set 5 are both lodged inside the same housing and supported with a particularly efficient and simple structure that reduces the number of components required.

Advantageously, in this way it is reduced the number of loss-generating elements and it is also removed the hurdle of designing the interfacing wall and the coupling structure between the housing of the rotor 4 and the gear set 5.

Furthermore, the above structure provides for a more compact design insofar it is also avoided the encumbrance from the intermediate wall allowing to reduce the overall size of the drive unit 1.

According to a possible embodiment, the rotor 4 comprises a central member extending along the rotation axis X and defining (or concurring to define) the rotor shaft 7 and an extension member 4a which protrudes radially from the central member and towards the stator 3.

Specifically, the extension member 4a protrudes perpendicularly from the central member and separates the rotor shaft 7 in two portion: a first portion developing from one side of the extension member 4a and to which the gear set 5 is coupled and a second portion developing from the other side of the extension member 4a.

In this context, the central member and the extension member 4a concur to define an annular seat which may lodge at least a portion of the gear set.

To this end, the extension member 4a may present at its extremity an enclosing wall 4b developing concentric to the rotation axis X of the rotor shaft 7.

Particularly when the gear set 5 is comprises two or more stages, at least one of them is inserted into the annular seat.

In this way it is possible to reduce the volume occupied by the drive unit 1 insofar the rotor 4 encloses at least a portion of the gear set 5.

To provide a further structural support for the components of the drive unit 1, the interface system may also comprise a further bearing, specifically an auxiliary bearing 15.

In this context, the planet carrier 11 presents a first side and a second side.

The axial protrusion that defines the gear shaft 12 develops from the first side of the planet carrier 11 while from the second side develops an annular abutment portion 16 which is also concentric to the rotor shaft 7.

The auxiliary bearing 15 is placed in direct contact between the rotor shaft 7 and the annular abutment portion 16 as could be seen in particular in the accompanying FIGS. 3A to 4B.

In other words, the rotor shaft 7 may be interface with the gear set 5 in two position: a first position wherein via the support bearing 14 the rotor 7 is coupled to the gear shaft 12 on the first side of the planet carrier 11 and a second position wherein via the auxiliary bearing 15 the rotor shaft 7 is coupled to the annular abutment portion 16 on the second side of the planet carrier 11.

Should the rotor 4 present the conformation required to define the annular seat, at least the auxiliary bearing 15 results to be placed inside it, as depicted in detail in FIGS. 3A to 4B.

Furthermore, in general, all the bearings implemented in the drive unit 1, may be rolling bearings: it is to say that at least one between the interfacing bearing 13, the support bearing 14 and the auxiliary bearing 15 can be a rolling bearing.

In this context, each bearing 13, 14 and 15 comprises an inner ring and an outer ring which are rotatable relative to each other.

Structurally, the inner rings of the support bearing 14 and, when present, of the auxiliary bearing 15 are directly coupled with the rotor shaft 7, while their outer ring is coupled to the rotor shaft 12 and to the annular abutment portion 16, respectively.

In general, the structure of the drive unit 1 is such that the rotor shaft 7 is coupled to an internal surface of the bearing 14, 15 (specifically the inner ring when the bearings 14, 15 are rolling bearings), while the gear set 5, which rotates at lower speed compared to the rotor shaft 7, is coupled (through its gear shaft 12 and/or it annular abutment portion 16) to an external surface of the bearings 14, 15.

In this way, in use, it is always guaranteed an optimal contact between the rotor shaft 7 and the bearings 14, 15, even when the first operates at maximum speed, insofar the centrifugal force causes the rotor shaft 7 to better adhere against the bearings 14, 15.

On the contrary, if the rotor shaft 7 were to be coupled to the outer surface of the bearings 14, 15 there could be a loss of contact between the two of them due to the high centrifugal force acting on the rotor shaft 7, thus reducing the lifetime of the bearings 14, 15 and increasing the overall noises and vibrations in the drive unit 1.

In general, it is to say irrespectively to the presence of the auxiliary bearing 15, the interface system comprises a support blocking element 17 applied to the support bearing 14 and configured to prevent axial movement of said support bearing 14.

In other words, the support blocking element 17 prevents axial displacement of the support bearing 14 and helps the same absorbing vibration thus reducing unwanted noises and potential damages in the drive unit 1 during operation.

Advantageously, the interface system may also or alternatively comprise an auxiliary blocking element 18, illustrated in detail in FIGS. 4A and 4B, applied to the auxiliary bearing 15, when present, and configured to prevent axial movement of said auxiliary bearing.

In other words, the auxiliary blocking element 18 acts on the auxiliary bearing 15 in a way that mirrors that of the support blocking element 17 on the support bearing 14.

Thus the drive unit 1 may comprise a single blocking element installed and operative either on the support bearing 14 or the auxiliary bearing 15 to fix them in position and avoid any unwanted axial displacement or, to provide even more stability, it may comprise two blocking element applied respectively to the support bearing 14 and the auxiliary bearing 15.

According to a possible embodiment, the rotor shaft 7 presents a threaded section, and the support blocking element 17 presents a corresponding threaded portion screwable to the threaded section.

In particular, as can be seen from the embodiments depicted in the attached figures, the rotor shaft 7 may present in one of its extremities an internally threaded seat and the support blocking element 17 has substantially the conformation of a screw, with the main body configured to be coupled with the seat in the rotor shaft 7 and the head configured to engage a side of the support bearing 14 to maintain it in position.

Further to the above, the drive unit 1 may also comprise a further blocking element configured to block/prevent the movement (specifically the axial movement) of the gear set 5.

In particular, the gear shaft 12 and/or the annular abutment portion 16 (when implemented) present on an internal surface a circumferential groove.

In this context, the support blocking element 17 and/or the auxiliary blocking element 18 further comprise a retaining ring 25 presenting an outer portion inserted in said groove and an inner portion extending towards the rotation axis X and positioned in abutment with the support bearing 14 and/or the auxiliary bearing 15.

In other words, the gear shaft 12 and the annular abutment portion 16 have a substantially tubular shape and their respective inner surface define a seat inside of which can be positioned the retaining ring 25.

The grooves of the gear shaft 12 and of the annular abutment portion 16 are preferably positioned so that the corresponding bearing (respectively the support bearing 14 and auxiliary bearing 15) is placed between it and the sun gear 8.

Alternatively, the axial movements of the components of the drive unit 1 may be prevented with the application of a pressure element 20.

Said pressure element 20 may comprise for example a pressure plate and is in general coupled to the rotor shaft 7 and configured to apply an axial load by direct contact respectively on the support bearing 14 or the auxiliary bearing 15.

Specifically, the pressure element, irrespective of being applied to the support bearing 14 or the auxiliary bearing 15, is configured to apply an axial load which is transmitted to the other component through the planet carrier 11.

In other words, the pressure element is configured to apply an axial load on the support bearing 14, which is then transmitted to the auxiliary bearing 15 through the planet carrier 11, or vice versa.

Figure 5A:
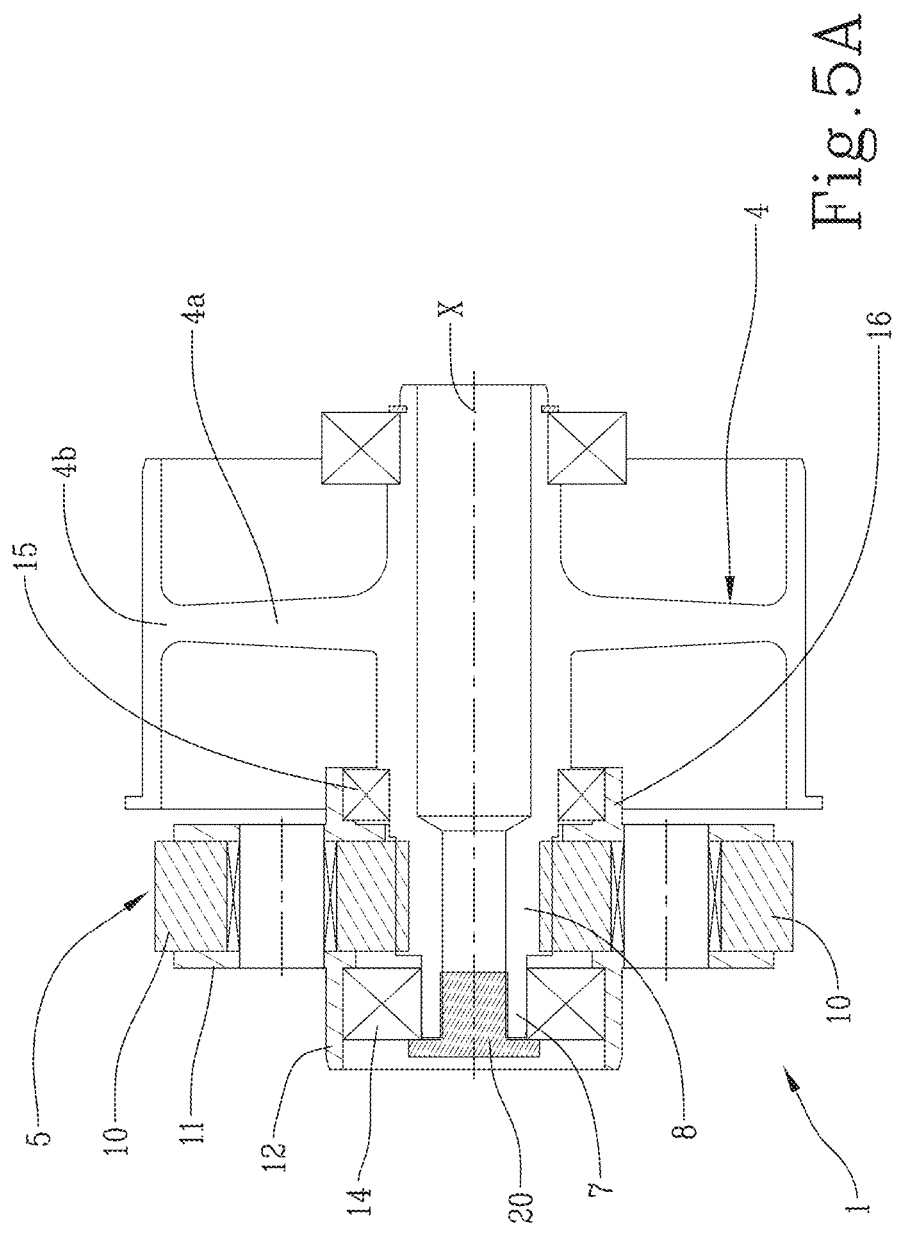
FIGS. 5A and 5B show a detail respectively of respectively a single stage and a multi-stage planetary gear set coupled to the rotor according to a fourth embodiment of the drive system.
Figure 5B:
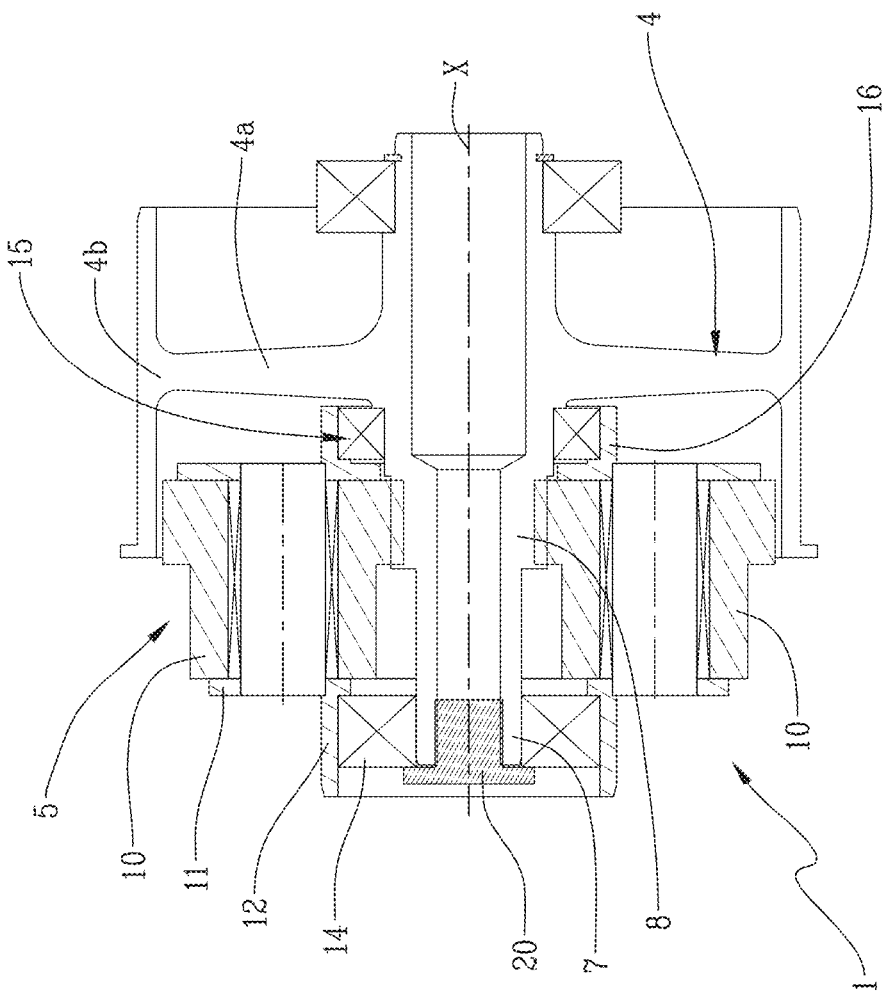

According to a possible embodiment, illustrated in detail in FIGS. 5A and 5B, the rotor shaft 7 presents a threaded section, and the pressure element 20 presents a corresponding threaded portion screwable to the threaded section.

Specifically, the rotor shaft 7 may present in one of its extremities an internally threaded seat and the support blocking element 17 has substantially the conformation of a screw, with the main body configured to be coupled with the seat in the rotor shaft 7 and the head configured to engage a side of the support bearing 14 to maintain it in position.

In this context, by regulating how much the support blocking element 17 is screwed to the rotor shaft 7 it is possible to apply a modulated preload force on the support bearing 14 (which is then transmitted to the auxiliary bearing 15) that helps keeping it in position even when the drive unit 1 is in use and thus subject to vibrations.

Advantageously the described drive unit 1 allows to overcome the drawbacks of the prior art by providing for a simplified structure wherein all the components are connected and supported in a particularly efficient way that also reduces the overall encumbrance of the unit.

Further to the above, the present invention also concerns a motor 19 comprising a first and a second drive unit 1 as illustrated in FIGS. 5A and 5B.

Figure 6A:
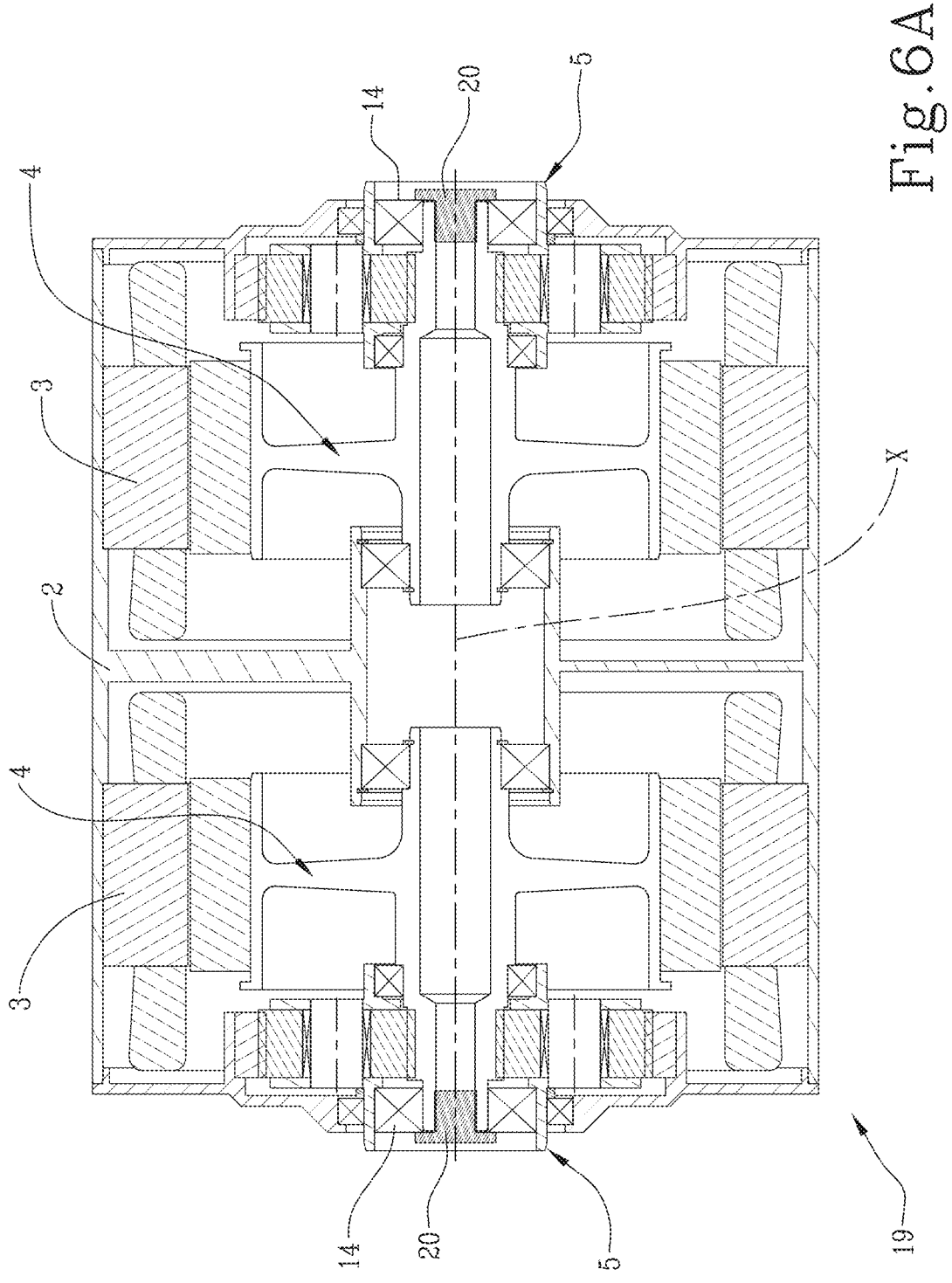
FIGS. 6A and 6B show motors equipped with the drive system of the present invention presenting a one stage and a multi-stage planetary gear set, respectively.

In particular, FIG. 6A shows a motor 19 equipped with drive units 1 presenting respective one-stage planetary gear set 5.

Figure 6B:
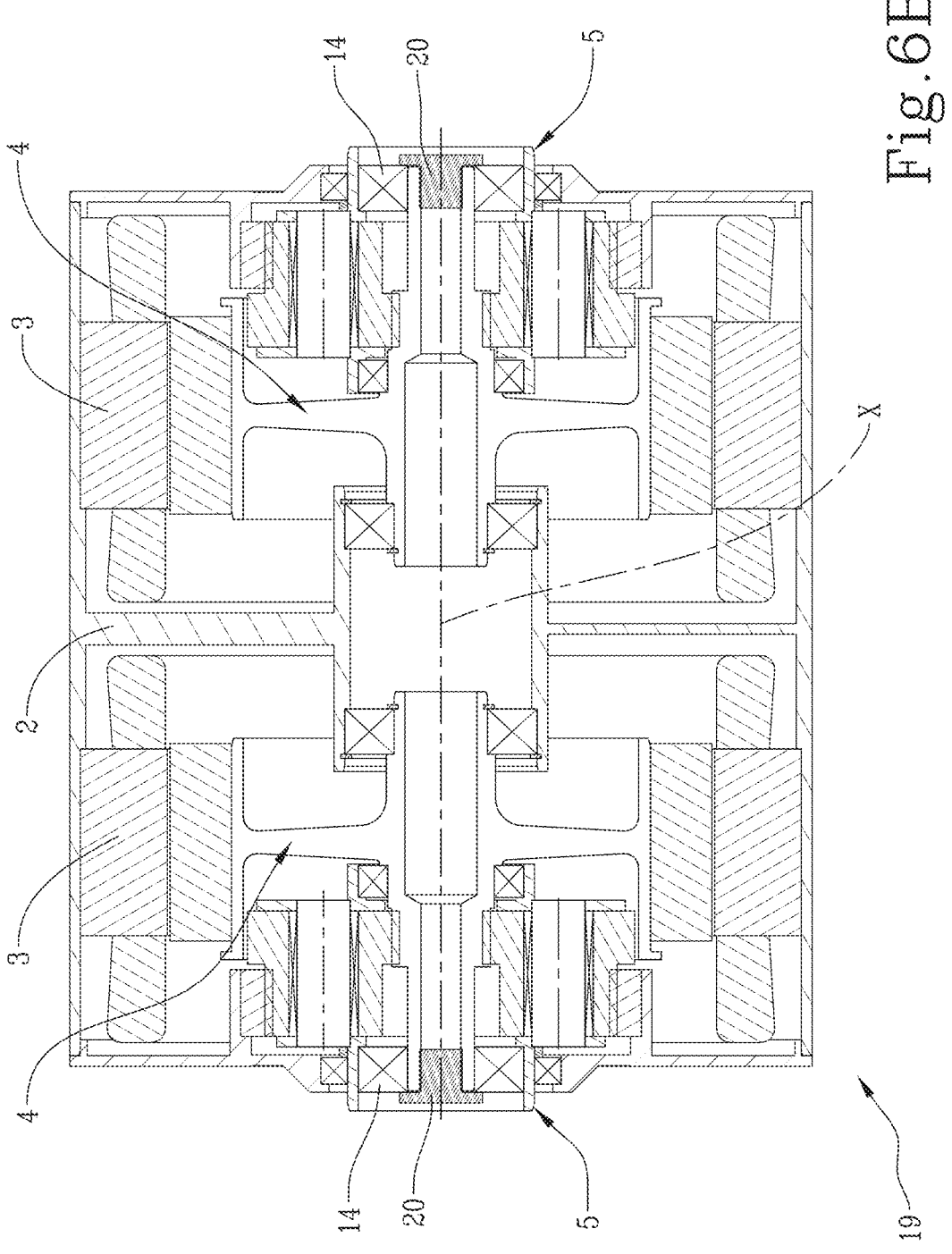

FIG. 6B shows instead a motor 19 equipped with drive units 1 presenting respective multi-stage (specifically two-stages) planetary gear set 5.

Structurally, the drive units 1 are made according to the above description, thus presenting any combination of the presented features and the corresponding advantages.

Furthermore, the drive units 1 are placed side by side with the respective gear shafts 7 being coaxial and faced outward in opposite directions.

In other words, the motor 19 comprises two drive unit which rotor shaft 7 are aligned and protrudes from opposite sides of the housing 2.

The provided configuration allows the use of two separate rotor shafts 7, each one only interfacing with the respective stator 3/gear set 5, insofar they are structurally supported on the housing 2 through the respective planetary gear set 5.

Thus, it is possible to avoid the presence of a single rotor shaft that runs through the entire housing 2 from one side to the other, reducing also the number of interfacing points between the various components of the motor 19.

The above results in a lighter structure that is also subject to less vibration when the motor 19 runs.

Furthermore, in this context the housing of the first and the second drive unit 1 can be made of a single piece.

It is to say, that the motor 19 comprises a single housing configured to define an internal volume inside of which are placed all the components of the first drive unit 1 and also all the components of the second drive unit 1 with the respective gear shafts 12 extending from opposite sides of said housing 2.

In this context, the housing 2 presents an intermediate wall that divides its internal volume in two chambers, each one configured to lodge a respective drive unit 1.

Advantageously, the specific structure/configuration of the motor 19 with the two independent and separated rotor shafts 7 helps cancelling the force acting on said intermediate wall, thus improving the overall stability of the motor 19 and reducing vibrations when it runs.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enabling others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present invention.

What is claimed is:

1. A drive unit, comprising:

a housing;

a stator lodged inside the housing;

a rotor inserted in the housing inside the stator and comprising a rotor shaft rotatable around a rotation axis and a sun gear coupled to the rotor shaft;

a planetary gear set placed inside the housing, comprising a ring gear fixed to the housing, a plurality of planet gears in meshing engagement between the sun gear and the ring gear, and a planet carrier supporting the plurality of planet gears, the planet carrier comprising an axial protrusion developing along the rotation axis and defining a gear shaft concentric to the rotor shaft; and an interface system configured to interface the rotor with the planetary gear set and comprising at least one support bearing interposed between the rotor shaft and the gear shaft, wherein the interface system comprises a support blocking element applied to the least one support bearing and configured to prevent axial movement of the at least one support bearing;

wherein the planet carrier presents a first side and a second side, the axial protrusion developing from the first side and the planet carrier comprising an annular abutment portion developing from the second side and concentric to the rotor shaft, and the interface system comprises an auxiliary bearing interposed between the rotor shaft and the annular abutment portion;

wherein the interface system comprises at least one pressure element coupled to the rotor shaft and configured to apply an axial load by direct contact on at least one of the support bearing or the auxiliary bearing;

wherein the least one pressure element is configured to apply an axial load on the support bearing that is transmitted to the auxiliary bearing through the planet carrier, or the at least one pressure element is configured to apply an axial load on the auxiliary bearing that is transmitted to the support bearing through the planet carrier; and wherein the rotor shaft has a threaded section, and the least one pressure element presents a corresponding threaded portion screwable to the threaded section.

2. The drive unit according to claim 1, wherein the interface system comprises an auxiliary blocking element applied to the auxiliary bearing and configured to prevent axial movements of the auxiliary bearing.

3. The drive unit according to claim 1, wherein the rotor comprises a central member extending along the axis of rotation to define the rotor shaft and one extension member radially protruding from the central member in a plane perpendicular to the rotation axis (X) and separating the rotor shaft into a first portion and a second portion; the planetary gear set being coupled to the first portion so as to interface the rotor shaft with the housing.

4. The drive unit according to claim 3, wherein the central member and the extension member define an annular seat configured to lodge at least the auxiliary bearing and at least a portion of the gear set.

5. The drive unit according to claim 4, wherein at least one of the support bearing or the auxiliary bearing is a rolling bearing.

6. The drive unit according to claim 5, wherein at least one of the support bearing or the auxiliary bearing comprises an inner ring coupled to the rotor shaft and an outer ring rotatable relative to the inner ring and coupled to the gear shaft or the annular abutment portion respectively.

7. The drive unit according to claim 6, wherein the planetary gear set is a compound planetary gear set comprising at least two stages.

8. The drive unit according to claim 7, wherein the rotor shaft presents a toothed portion configured to define the sun gear so that the rotor shaft and the sun gear are made of a single piece.

9. The drive unit according to claim 8, comprising an interfacing bearing interposed between the gear shaft and the housing, the interfacing bearing being concentric and axially overlapping the support bearing.

10. A motor, comprising:

a housing;

a first stator lodged inside the housing;

a first rotor inserted in the housing inside the first stator and comprising a first rotor shaft rotatable around a rotation axis and a first sun gear coupled to the first rotor shaft;

a first planetary gear set placed inside the housing, comprising a first ring gear fixed to the housing, a plurality of first planet gears in meshing engagement between the first sun gear and the first ring gear, and a first planet carrier supporting the plurality of first planet gears, the first planet carrier comprising an axial protrusion developing along the rotation axis and defining a first gear shaft concentric to the first rotor shaft;

a first support bearing interposed between the first rotor shaft and the first gear shaft, and a first support blocking element applied to the first support bearing and configured to prevent axial movement of the first support bearing;

a second stator lodged inside the housing;

a second rotor inserted in the housing inside the second stator and comprising a second rotor shaft rotatable around a rotation axis and a second sun gear coupled to the second rotor shaft;

a second planetary gear set placed inside the housing, comprising a second ring gear fixed to the housing, a plurality of second planet gears in meshing engagement between the second sun gear and the second ring gear, and a second planet carrier supporting the plurality of second planet gears, the second planet carrier comprising an axial protrusion developing along the rotation axis and defining a second gear shaft concentric to the second rotor shaft; and a second support bearing interposed between the second rotor shaft and the second gear shaft, and a second support blocking element applied to the second support bearing and configured to prevent axial movement of the second support bearing;

wherein the first gear shaft is coaxial with the second gear shaft and faced outward in opposite directions.

11. The motor according to claim 10, wherein the housing further comprises an intermediate wall dividing an internal volume of the housing in two adjacent chambers such that the first stator, the first rotor, the first planetary gear set and a first interface system being positioned within a first chamber on one side of the intermediate wall, and the second stator, the second rotor, the second planetary gear and a second interface system being positioned within second chamber on an opposite side of the intermediate wall.

12. The motor according to claim 11, wherein the first rotor comprises a central member extending along the axis of rotation to define the rotor shaft and one extension member radially protruding from the central member in a plane transverse, perpendicular, to the rotation axis and separating the rotor shaft in a first portion and a second portion; the planetary gear set being coupled to the first portion so as to interface the rotor shaft with the housing, whereby the first rotor and the planetary gear set remain lodged within the first portion of the housing, and wherein the second rotor comprises a central member extending along the axis of rotation to define the rotor shaft and one extension member radially protruding from the central member in a plane transverse perpendicular, to the rotation axis and separating the rotor shaft in a first portion and a second portion; the planetary gear set being coupled to the first portion so as to interface the rotor shaft with the housing, whereby the second rotor and the planetary gear set remain lodged within the first portion of the housing.

13. The motor according to claim 12, further comprising interfacing bearings interposed between the respective gear shaft and the housing, the interfacing bearings being concentric and axially overlapping the respective support bearing, so that the respective the rotor shaft can be supported on the housing in turn by the support bearing, the gear shaft and the interfacing bearing.

* * * * *